H. BELL.
Corn-Planter.
No. 30,866. Patented Dec. 11, 1860.
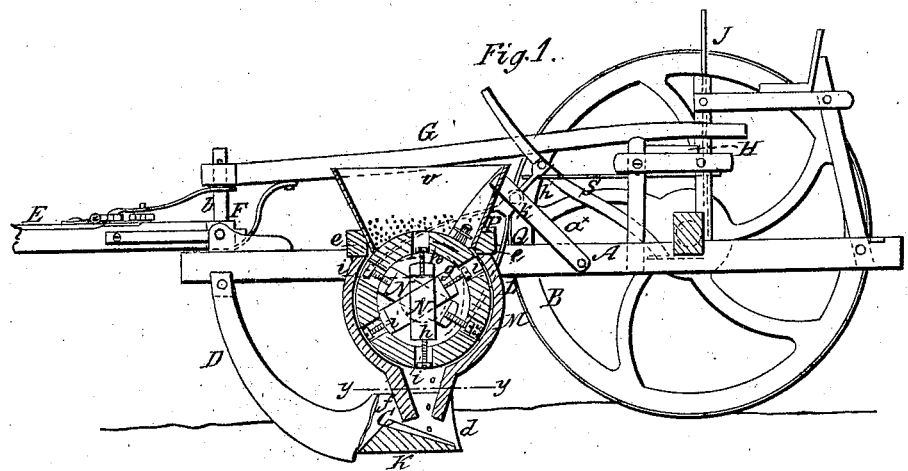
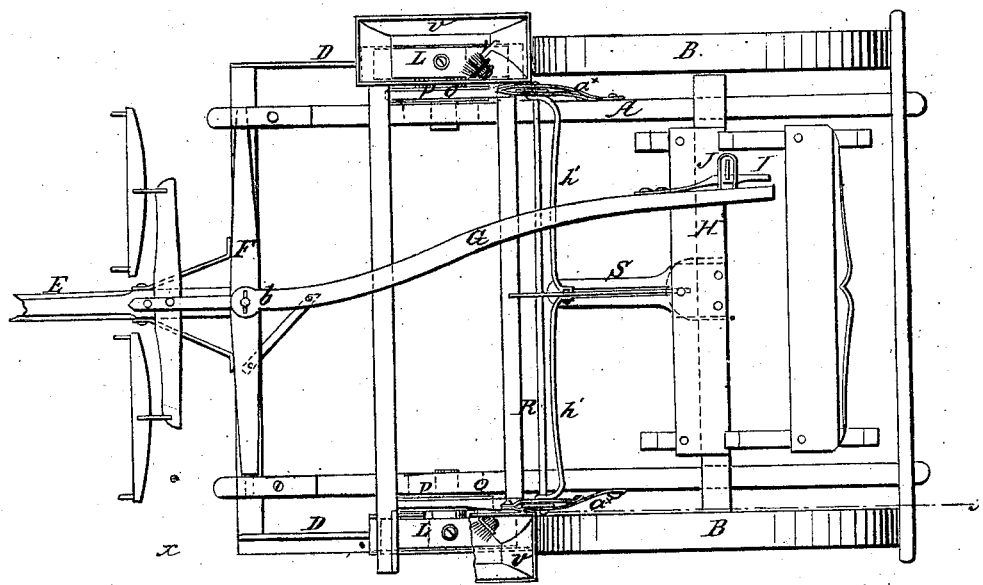
Witnesses.
J. W. Combs
R. S. Spencer
Inventor.
Henry Bell
by Munn & Co.
Attys.

UNITED STATES PATENT OFFICE.

HENRY BELL, OF CLINTON, ILLINOIS.

IMPROVEMENT IN SEEDING-MACHINES.

Specification forming part of Letters Patent No. 30,866, dated December 11, 1860.

*To all whom it may concern:*

Be it known that I, HENRY BELL, of Clinton, in the county of De Witt and State of Illinois, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x$ $x$, Fig. 2; Fig. 2, a plan or top view of the same; Fig. 3, a horizontal section of the seed-spout of the same, taken in the line $y$ $y$, Fig. 1.

Similar letters of reference indicate corresponding parts in the several figures.

The object of the invention is to obtain a machine that may be used for planting seed either in hills or drills and without the liability of having its seed-distributing parts choked or clogged.

To enable those skilled in the art to understand and construct my invention, I will proceed to describe it.

A represents a rectangular frame, the back part of which is supported by two wheels, B B, the front of the frame being supported by furrow-shares C, which are of V form in their horizontal section, and have curved colters D attached to them, which colters extend upward and are attached to the front end of the frame A, as shown clearly in Fig. 1.

E is the draft-pole, the back end of which is attached to a cross-bar, F, which has its ends fitted loosely in bearings or sockets $a$ on the frame, the bar F being allowed to turn freely in the sockets $a$.

To the bar F, at its center, there is attached an upright, $b$, to the upper end of which there is connected a lever, G. This lever G extends back over the driver's seat H, and is retained at any desired spot by a catch, I, which is attached to the lever and engages with a notched bar, J, attached to the frame A. The depth of the furrows may be regulated by adjusting the lever G.

In the furrow-shares C C there are placed blocks K—one in each. These blocks form bottoms to the shares C. The upper surfaces of the blocks are inclined and have grooves $c$ $c$ made in them—two in each. Both grooves are shown in Fig. 3. The back ends of the shares C C are open, as shown at $d$ in Fig. 1.

L L are wheels, which are placed each in curbs M, the latter having their upper ends attached to the frame A, as shown at $e$, and their lower ends secured in the upper parts of the shares C, as shown at $f$. The wheels L are sunken at their outer sides; or they may be described as having circular recesses $g$ in them to receive slide-bars N. The bars N have each a screw, $h$, in each end, and these screws fit in holes $i$, which are made in the peripheries of the wheels L. The bars N are somewhat shorter than the diameters of the recesses $g$, so that a certain degree of play is allowed each bar N, as will be seen by referring to Fig. 1. The axes of the wheels L project through the inner sides of the curbs M and have each a ratchet, O, on them. These ratchets have each two pawls, P Q, engaging with them, one, P, being a drawing and the other, Q, a shoving pawl. These pawls are attached to the ends of a bar, R, which is connected by arms $h'$ $h'$ to a lever, S, which is directly in front of the driver's seat H. The ends of the bar R are supported by arms $a^\times$.

U U are hoppers, which are placed over the wheels L L to receive the seed to be dropped or planted. In each hopper U there is secured a cut-off brush, V, said brushes being in contact with the peripheries of the wheels L L.

The operation is as follows: As the machine is drawn along, the operator on the seat H works the lever S back and forth, and the pawls P Q give a rotary motion to the wheels L L, which are turned at each movement of the lever such a distance as to bring a hole, $i$, directly over the inclined surface of the blocks K. The holes $i$ in the wheels fill with seed as they pass around at the bottom of the hopper U, the bars N dropping by their own gravity as the holes $i$ reach an opening, $a^\times$, and when each bar N drops and its lower screw-head clears the lower hole $i$ the upper screw-head of course falls and the upper hole $i$ fills with seed. The seed falls on the upper inclined surfaces of the blocks K, and the grooves $c$ cause the seed to be spread in the furrows, the grooves conveying it to either side. The cut-off brushes V perform their usual function.

Having thus described my invention, what I claim as new, and desire to secure by Letters Patent, is—

The wheels L L, provided with sliding bars N, having screws $h$ at their ends, which are fitted in the holes $i$ of the wheels, in connection with the curbs M, which encompass the wheels, all being arranged as and for the purpose herein set forth.

HENRY BELL.

Witnesses:
 JOSEPH H. HUMPHREYS,
 JERH. RHOADES.